INVENTOR.
Robert Edward Burton
Attorneys

United States Patent Office 3,192,154
Patented June 29, 1965

3,192,154
SEPARATION OF COLLOIDAL SOLIDS FROM LIQUIDS
Robert E. Burton, 475 San Francisco Ave., Willits, Calif.
Filed Sept. 12, 1962, Ser. No. 223,136
11 Claims. (Cl. 210—3)

This invention generally relates to the separation and removal of colloidal solids from various fluid systems, including both liquid and gaseous systems, and particularly relates to methods and means for this purpose making use of natural fibers such as redwood or other bark fibers.

There was a time when virtually all waste products were turned loose into the air or run into the nearest stream irrespective of odor, color, or toxicity. Today, stringent procedures are required or imposed on most manufacturers to insure adequate disposal of waste, with the result that much time and energy is spent in ascertaining how either to neutralize the waste, to destroy it, or to turn it into something useful. However, despite these measures, it is not always possible to successfully dispose of waste, particularly in the case of fluid wastes containing dispersed microscopic or colloidal waste solids. Since virtually all living matter can be broken down into colloidal materials, including almost all our food (e.g., proteins and starches), our clothing (whether of natural or synthetic origin) and our shelter materials (e.g., wood, bricks, cement, concrete, etc.), a solution to the problem of separating and removing colloidal solids from waste fluids is highly to be desired.

By way of illustration, most sewage treating processes involve filtering or other mechanical clarification to remove settleable solids, following which the liquid effluent containing dissolved and suspended solids is subjected to aerobic microorganisms present in trickling filters, or activated sludge systems, to effect digestion of contaminants. However, these systems are generally ineffective to remove the large amounts of colloidals solids normally present, with the result that substantial amounts of such colloidal solids "remain in" the "clarified" discharge.

Similar problems are encountered with various other types of industrial waste liquids. For example, the canning of various types of pulpy foods, such as pumpkin, peaches, various vegetables, etc., produce large amounts of effluent liquids (canning wastes) containing colloidal organic solids. Wastes from breweries, meat packing plants, milk processing plants, rendering plants, and other food processors, present similar problems. These wastes are frequently discharged to trickling filters or similar treatment systems in an effort to purify the wastes, thereby presenting problems of contamination with colloidal solids similar to those outlined above. The chemical industries also produce large quantities of fluid wastes containing colloidal solids. Examples include sulfie wastes from paper mills, tannery wastes, fermentation "slops," zeolite brines, and so on.

Air pollution or atmospheric contamination is likewise an acute problem in many areas, due to the presence of contaminants in the form of airborne solids. Examples of well known contaminants include colloidal cement dust derived from cement plant operations, fly ash in exhaust gases from coal-fired power houses, and colloidal contaminants in salt-cake fumes from black-ash furnaces of paper mills, or in acid-mists from chemical plants, to name just a few. Vast sums are spent each year in an attempt to overcome the problems of airborne contaminants, for example, on electrostatic precipitators, centrifugal separators, packed beds, scrubbers, sonic collection equipment, and so on.

In general, a principal object of the present invention is to provide a novel, simple, highly effective method and means for separating and removing colloidal solids from fluid systems, both liquid and gaseous.

A further object of the invention is to provide methods and means of such character capable of use with a wide variety of fluid waste materials to effect removal of colloidal waste solids.

Another object of the invention is to provide an improved method of the above character which does not require complicated procedures or machinery and which is applicable to virtually any present day waste disposal system.

Another object of the invention is to provide methods and means of such character which utilize the colloidal waste solids and turn them into something having commercial value.

Another object of the invention is to provide systems of such character which are highly efficient in that they remove virtually all the colloidal waste or other colloidal solids present in the fluid system.

Additional objects and advantages of the invention will appear from the following description in which illustrative embodiments have been set forth in detail in conjunction with the accompanying drawings.

Referring to the drawings.

Figure 1:
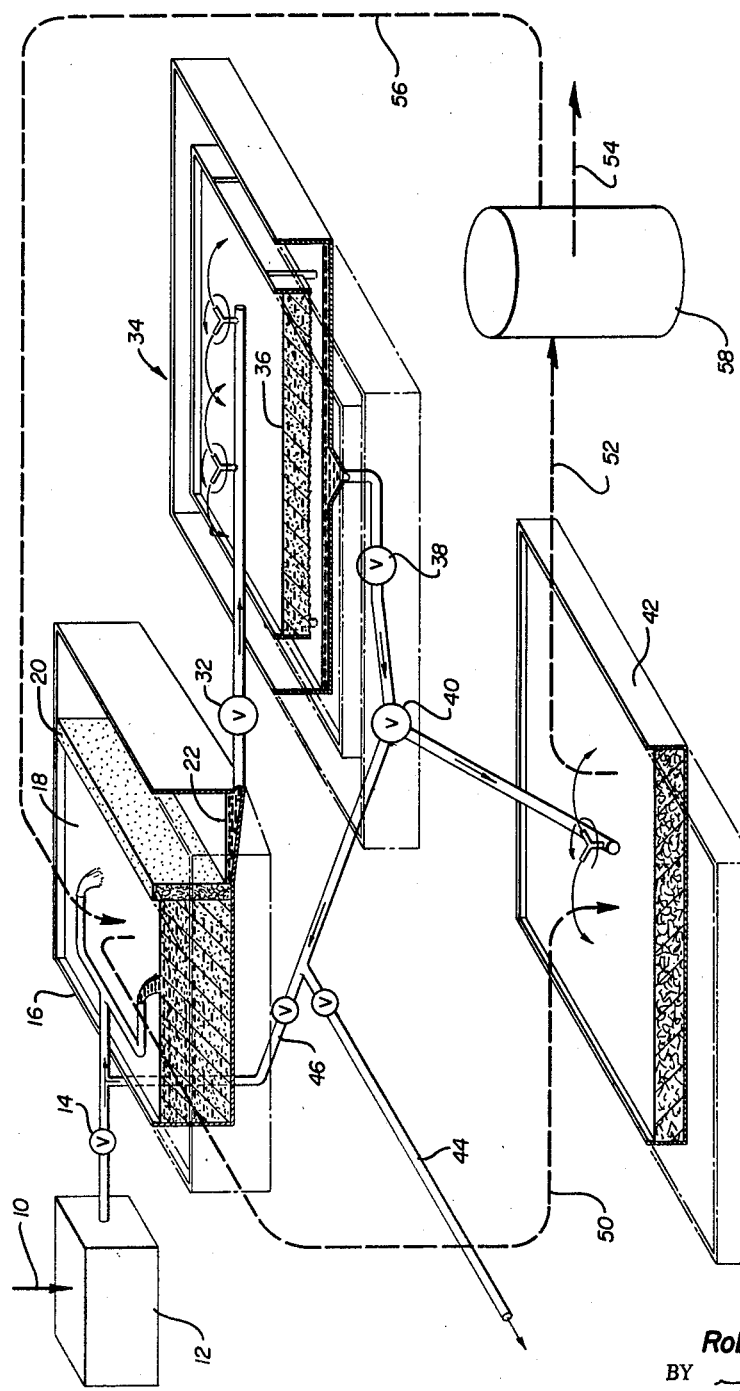
FIGURE 1 is a schematic flow sheet illustrating the use of a system in accordance with the invention in separating colloidal solids from liquid systems.

The present invention is predicated on my discovery that in the presence of moisture, colloidal solids are selectively attracted to natural bark fibers, for example, redwood and similar bark fibers, and can thereby be effectively removed from fluid systems moving in contact with or passing through such fibers. My process generally depends upon the pre-wetting of a profusion of such fibers, followed by dispersal of the pre-wetted fibers in a zone of contact with the colloidal-solid-containing fluid. In some cases, moisture or free water is also employed to effect agglomeration of the colloidal particles prior to contact with the fibers. My process permits effective removal of colloidal solids from virtually any liquid system containing colloidal solids, such as raw or clarified sewage, cannery wastes, wastes from various chemical and food processing plants, and a wide variety of additional liquid wastes containing colloidal solids. It also provides a means to effectively remove and control gas-borne colloidal solids, such as cement dust, fly-ash, black-ash, and the like, which heretofore have been a prime source of atmospheric contamination and pollution.

Broadly stated, my invention involves the contacting of a fluid system containing colloidal solids in such fashion that a profusion of individualized bark fibers are placed in close proximity to the colloidal solids in the path of fluid flow through or in contact with the fibers. In accordance with one concept of the invention, used, for example, in conjunction with sewage treatment, raw sewage is first screened to remove gross solids and then flowed into a tank or reservoir containing freely dispersed redwood bark fibers. These fibers attract the colloidal solids, apparently by the mechanism of cataphoresis or electrophoresis, as hereinafter explained, following which the fluid is separated from the fibers to effect separation and removal of the colloidal solids. In accordance with another concept of the invention, used, for example, in dust collection systems, as in cement plants, a loosely felted, pre-wetted mat of the fibers is placed in the path of waste gases carrying the unwanted colloidal dust. The pre-wetted fibers again serve to attract the colloidal solids, apparently by a similar electrostatic mechanism, effecting removal of these solids from the fluid stream, which is discharged in the purified state.

My process also contemplates that the fibers and separated colloidal solids can be recovered from the fluid system for further treatment or use, taking advantage of the combined properties of the fibers and attached colloidal solids.

As is well known, the colloidal state is determined by the size of the solid particles, being intermediate in size between visibly suspended particles and invisible molecules (i.e., ranging from 0.001 to 0.01 micron). As used herein, the term "colloidal solids" is intended to include particles within this range of sizes brought into the colloidal state either by comminution or dispersion from macroscopic size (i.e., visible to the eye) to ultramicroscopic or colloidal size or, conversely, by agglomeration, precipitation, or condensation from sub-ultramicroscopic or molecular or solution size to colloidal size. The term is also intended to include such particles either without or with accompanying particles large enough to settle out of the fluid medium.

My process is best described by reference to the particular fluid system undergoing processing, and will first be described in connection with the removal of colloidal solids from an aqueous liquid system contaminated with organic colloidal solids, for example, sewage or canning waste. As shown in FIGURE 1, the contaminated liquid enters the system at 10 and is first screened or otherwise mechanically processed at 12 to remove gross solids. The partially clarified liquid is then introduced through a valve or like feed mechanism 14 to a contact zone of relatively large surface area, represented by the tank 16, to form a body of liquid 18. Initially, a profusion of the individualized bark fibers is dispersed in the body of liquid in tank 16. In the illustrated apparatus, a filter 20, which may consist of a mat of the same fibers, screening, wire mesh, etc., preferably subdivides the tank 16 to provide a discharge reservoir 22 for effluent from the tank.

In accordance with the invention, the fibers dispersed in the tank 16 are substantially individualized bark fibers, particularly redwood bark fibers, obtained from customary lumbermill operations. As is well known, the methods employed in lumbering the California redwood, Douglas fir, and similar commercial woods produce substantial amounts of bark. By way of illustration, the unusual thickness of redwood bark (e.g., averaging two to ten inches in old growth) normally produces as much as 400 to 600 cords of bark per million feet of board measure (Spaulding). Approximately 50% of this bark is recovered from conventional debarking, shredding, and dust separation operations (e.g., employing hydraulic debarkers, belt type shredders, swing hammer-type hogs, flails, rotary and vibratory screens, etc.) in the form of fibers capable of use in the present invention. While any commercial source of bark fibers can be utilized in carrying out my process, a particularly satisfactory source of such fibers is illustrated in U.S. Patent 3,042,977. These fibers are available in the form of loosely felted pads of substantially individualized fibers, which can be readily broken apart for use in the processing herein described.

Figure 3:
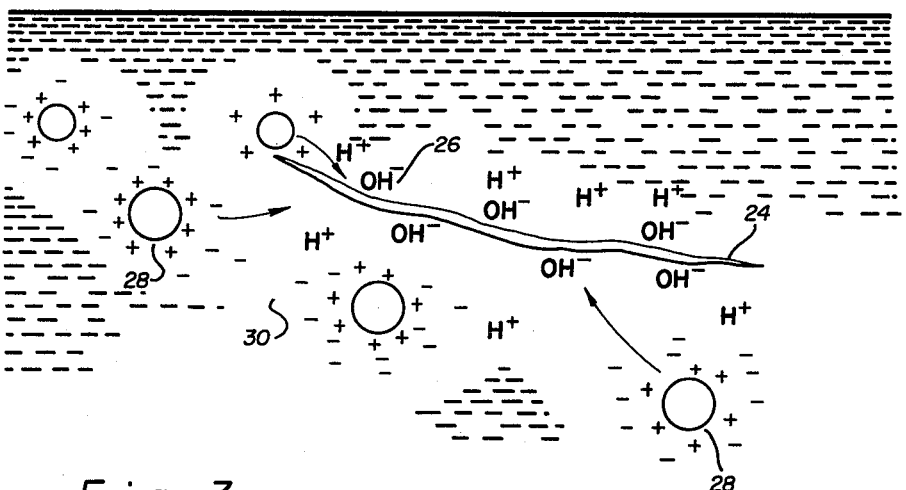
FIGURE 3 is a schematic representation, on a greatly enlarged scale, illustrating the separation of colloidal solid particles from a liquid system.

It is a feature of the invention that the freely dispersed bark fibers in the tank 16 attract the colloidal solids in the entering liquid, causing the solids to adhere to the pre-wetted fibers, thereby effectively separating the solids from the liquid discharged at 22. This unexpected attraction of the bark fibers for colloidal solids is believed to result from an electrostatic charge on the surface of the fibers, due apparently to adsorption of hydroxyl ion from water, which is opposite to the electrostatic charge of colloidal particles in the liquid. This phenomenon is schematically represented in FIGURE 3, wherein 24 represents a bark fiber of the type dispersed in the tank 16, and 26 the hydroxyl ion adsorbed on the fiber. It is believed that the hydroxyl ion is adsorbed in such fashion that the hydrogen ion forms the outer layer, with the result that the bark fiber is characterized by an essentially negative charge. In a stable colloidal system, such as exists in the clarified sewage or canning waste liquid entering the tank 16, anions on the surface of the colloidal micelles continually unite with the cations in the liquid system to form molecules which attach themselves to the surface of the colloidal micelles, whereas the molecules on the surface of the colloidal micelles continually break up into anions and cations. Accordingly, under equilibrium conditions, the colloidal micelles carry a predominantly positive charge, as indicated at 28, creating a strong electrostatic attraction (electrophoresis) between the micelles and the negatively charged bark fibers 24.

In a liquid system of the type illustrated in FIGURE 1, the colloidal particles are attracted to the bark fibers in more or less continuous fashion, until the space around an individual fiber is substantially covered by the colloidal micelles. With a proper proportioning and renewal of bark fibers relative to the liquid feed to tank 16, a virtually complete separation of colloidal contaminants can be obtained. This result is possible because of the extensive surface area presented to the liquid by the profusion of separated free-floating fibers. I have observed, for example, at a ratio of 1 part fiber to about 1700 parts raw feed, the proportion of colloidal solids in the liquid effluent discharged from reservoir 22 can be reduced to no more than about 2 to 5% of the colloidal solids present in the entering feed liquid. The net effect is to obtain the benefit of electrostatic separation of colloidal solids in the tank 16, without the use of outside sources of electricity.

By way of an example, in tests employing an open pond system of the type illustrated in FIGURE 1, pumpkin canning waste containing from 7 to 32 milliliters of settleable solids for each liter of feed liquid (as measured by the Imhoff Cone technique) are introduced to the pond at the rate of 1 million gallons per day. The pond contains approximately 1 ton of redwood bark fibers in the form of individualized fibers and bundles, the individual fibers being of a diameter no greater than about 1 millimeter and ranging in length from about 1 to 10 centimeters. Determination of chemical oxygen demand (COD) of the entering waste liquid ranged from 153 to 230 parts per million (determined by the dichromate method). After the separation treatment in the pond, the effluent liquid is observed to be of a clarity comparable of the fresh water supply, and to have a solids content of less than 0.05 milliliter per liter, representing a reduction of colloidal solids content approaching 100% (i.e. 99.3 to 99.8%). The COD of the effluent ranged from 115 to 185 parts per million, representing a reduction of from 17 to 29% due to removal of the colloidal solids. On a 24-hours basis, 1 ton of bark fibers removes colloidal solids in the amount of 10 tons of pumpkin per day. Removal of bark fibers from the pond produces approximately 8 tons of bark fibers and adhered colloidal slime.

This processing generally indicates that the free fibers in the pond remove virtually all of the suspended colloidal solids, without the use of elaborate equipment. The COD is reduced 15 to 30% by passage through the system, and can be virtually eliminated by passing through an aerating system employing a trickling filter, as hereinafter described.

In processing to remove organic colloidal solids from liquid wastes, as in the treatment of canning wastes, sewage, etc., as described above, the processing in the tank 16 can be advantageously carried out in the presence of aerobic microorganisms which serve to renew the fibers for use in the separation process. As is well known, such bacteria produce an effluent which is not foul, and are effectively used in my system to permit direct discharge of the waste effluent in situations where dilution is not easily practiced or desirable. Alternatively, such a system can be operated as a closed system, for example as illustrated in FIGURE 1. As there illustrated, the effluent from the reservoir 22 is discharged through suitable valve means 32 to an aeration system 34. Since the biological oxygen demand (BOD) of the effluent remains high, the aeration system 34 can also be advantageously employed in conjunction with a trickling filter, indicated at 36, to restore dissolved oxygen to the effluent. The trickling filter 36 can be constructed and operated in the general manner disclosed in my Patent 2,995,434, to effectively remove dissolved contaminants, such as dissolved sugars, starch, proteins, etc., while at the same time restoring dissolved oxygen to the effluent liquid. Advantageous use of the trickling filter 36 is possible due to the removal of colloidal solids from the effluent, since the tendency of such solids to clog the surface of the filter and render the same inoperative is virtually eliminated. In a closed system of the type described, the purified effluent from the trickling filter could be discharged through suitable valves 38, 40, for use in tank 42, or discharged through the line 44, or recycled through the line 46 to the separation tank 16. For example, I have found the separation of colloidal solids in closed systems to be particularly efficient when the effluent is recycled to tank 16 at a ratio of approximately three parts of recycled liquid to about one part of feel liquid (range 1:1 to 5:1).

As an example of the processing in closed systems, effluent from the primary clarifier of a domestic sewage plant is introduced to the tank 16, containing about 3½ tons of bark fiber, at the rate of 460,000 gallons per day. The entering liquid has a biological oxygen demand (BOD) ranging from 160 to 300, a dissolved oxygen content of approximatley zero, visual clarity (by light conduction technique) ranging from 6 to 12.5, and a chemical oxygen demand (COD) ranging from 37 to 53. Following clarification, the BOD of the treated liquid (measured at point 44, FIGURE 1) is 3.8 to 16, the dissolved oxygen content ranges from 3.6 to 5.3 p.p.m., clarity measurements are of the order of 16 to 20, and COD is reduced to between 12 to 27. The processing therefore results in an average reduction in BOD of about 95%, an average increase in dissolved oxygen content in excess of 4 p.p.m., a capacity for light transmission approaching that of distilled water (7P increasing to 20, whereas the value for distilled water is 22), and a reduction in COD of approximately 40 to 60%.

Where bacterial digestion of the solids in the tank 16 is not sufficiently rapid, or is impractical, the fibers and attached colloidal solids can be removed from the tank 16 for separation of the solids and return of the fibers for redispersal in the tank 16. Such processing is represented schematically by the stages 50 through 56, which are suggestive of a number of different ways in which such fiber regeneration might be carried out. Thus, assuming the separation of colloidal food wastes or other organic wastes, separation might be carried out by worms or other living organisms in the tank 42. Earthworms, for example, have considerable commercial value and could be cultivated in a bed of removed fibers and colloidal solids in tank 42. Such processing would involve the further separation of the worm castings by centrifuge, shaker screen or other suitable means 58, and return of the fibers to the tank 16 (stages 52 through 56). The separated worm castings also have commercial value as fertilizer, containing up to 11% available nitrogen.

The principal advantage of the processing just described resides in the removal of colloidal solids from the entering liquid in an easy, convenient, economical manner. The processing also provides for separation of the colloidal solids from the fibers, and return of the fibers for redispersal in the separation tank 16, as well as discharge of the separated colloidal solids for disposal in a useful manner. As an alternative, the fibers and attached colloidal solids could be separated for use as an independent product, i.e., as a soil conditioner, fuel, etc.

Figure 2:
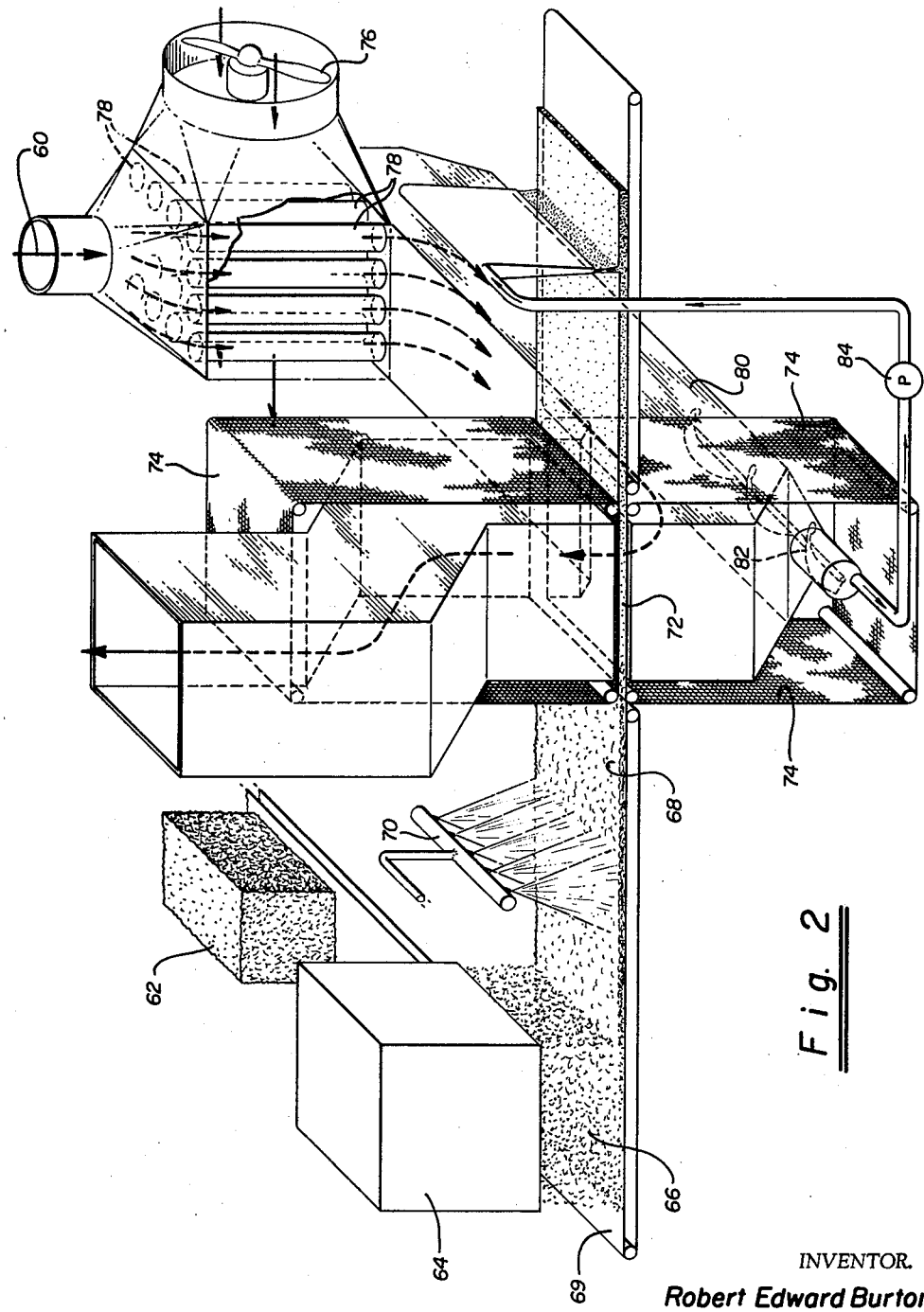
FIGURE 2 is a schematic flow sheet illustrating the use of a system of the invention in separating and removing colloidal solids from gaseous systems.

In the treatment of gaseous systems containing colloidal solids, such as air-borne cement dust, fly-ash, etc., it is desirable to pre-wet the fibers to insure the electrostatic attraction between the fibers and the colloidal particles. A gaseous separation system of this type is illustrated in FIGURE 2 in conjunction with a typical cement plant operation. In such system the exhaust air from the kiln carrying the colloidal cement dust is introduced at 60. Bales of redwood bark fibers from commercial lumbermill operations simultaneously enter the system at 62, and are reduced to substantially individualized fibers by the apparatus represented by 64. Such apparatus can comprise a pair of superposed belts which flex and break up the bales, coupled with a flail to reduce the fibrous mass to the substantially individualized fibers suitable for purposes of the invention. Alternatively, such apparatus can be of the type described in Patent 3,042,977 up to the point of discharge from the fiber distributing station.

The fibers discharged at 66 are formed into a loosely felted mat 68, employing vibration to obtain fiber orientation and a uniform density. These mats can be formed in a batch process or preferably in a continuous process as illustrated in FIGURE 2. In the latter process, the mats are deposited on an endless belt 69 and passed under a liquid spray 70 to effect a pre-wetting of the mat prior to delivery to a zone of contact with the entering gases at 72. Suitable means such as the moving endless screens 74 can be employed to support the mat as it passes through the contact zone 72. As indicated previously, the cement-laden gas enters the system at 60, and is initially cooled from an inlet temperature of approximately 750 to about 220° F. In the illustrated apparatus, cooling is effected by means of a blower or other suitable means 76, which circulates cooling medium about the gas passing through the conduits 78. If desired, the heat which is removed at this stage can be utilized for pre-heating the limestone or other materials used in the making of cement to increase the efficiency of the entire operation.

Since the exhaust gases from the kiln may constitute as much as 40% water vapor, the indicated reduction in the temperature of the exhaust gases causes the formation of a colloidal suspension of water vapor droplets, which attract the cement dust particles to produce agglomerates or micelles of colloidal sizes. These agglomerated particles then pass with the gas to the contact zone at 72. Some of the larger particles however may fall out of the air stream, in which case they can be collected as a moist powder or slurry in the bottom 80 of the plenum chamber for discharge by the conveying mechanism 82 and pump 84.

Figure 4:
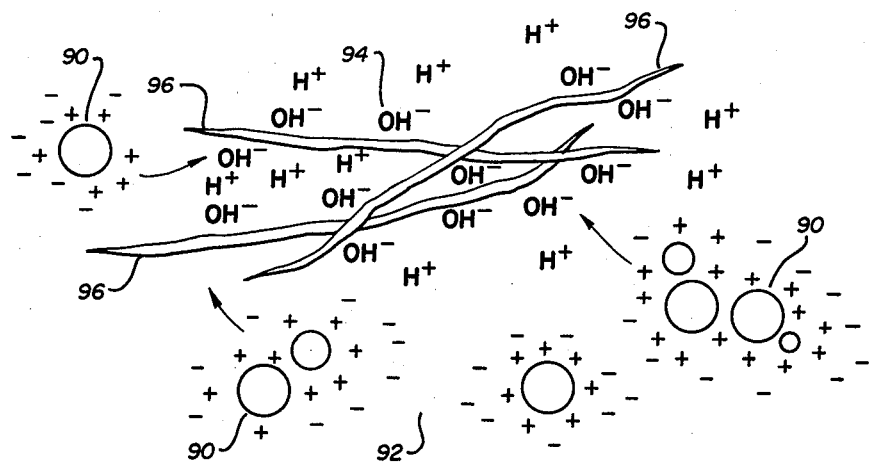
FIGURE 4 is a like view, illustrating the separation of colloidal solids from a gaseous system.

In the contact zone 72, the agglomerated particles of cement dust are attracted to the fibers in the mat 68 and generally are removed from the exhaust gases in a single pass. I have found, for example, that almost complete removal of cement dust and similar contaminants can be obtained with a layer of redwood bark in the contact zone 72 no more than 1 to 2 inches in thickness. While this unexpected efficiency of dust removal is not entirely understood, it is believed to result from a phenomenon of electrostatic attraction or cataphoresis, similar to that described in connection with FIGURE 3. Thus, as illustrated in FIGURE 4, the exhaust gases present a stable colloidal system of predominantly positively charged colloidal particles or agglomerates 90 in a negatively charged gaseous dispersion medium 92. Initially, water vapor molecules are also dispersed in the air, however, as cooling of the stack gases commences, the water vapor molecules condense into tiny droplets and flocculation takes place as Van Der Waals forces become stronger than the repelling force of the electrical charge. Although gravity causes the larger micelles to fall, producing a moist dust in the bottom trough 80, the buk of the dust micelles are carried along with the air stream to the contact zone 72. As the water droplets and smaller micelles of the colloidal dust pass into contact with the bark fiber pad 68 in the zone 72, the hydroxyl ions of the water are adsorbed on the bark fiber, causing the hydrogen ion to again form the outer layer as shown at 94 in FIGURE 4. The phenomena is thus similar to that described above, with the now predominantly negatively charged bark fibers 96 attracting the positively charged dust micelles 90. In this case, however, as the micelles enlarge, they absorb the free water and remain firmly attached to the fiber to effect their separation and removal from the gas. This process continues until the spaces around the individual fibers are full of the colloidal dust micelles. In the gaseous system, the benefits of an electrostatic precipitation system (i.e., as in a Cottrell system) are again obtained without recourse to external sources of electricity.

It is to be noted that the condensed moisture in the circulating gas serves to replace the moisture initially adhering to the fibers as a result of the pre-wetting operation induced by the spray 70. In this way the exposed surfaces of the fibers are continually wetted, and maintained in the desired pre-wetted condition.

In the cement dust system described, the rate of advance of the bark fibers is such that sufficient fiber surface is presented to the exhaust gases to insure removal of substantially all of the dust from the air. The cement impregnated mat is then advanced continuously from the contact zone 72 for further processing. If desired, the slurry of moist dust discharged by the means 82, 84 can be deposited on the top of the discharged fibrous mat so that additional cement dust is incorporated within the interstices between the fibers. This processing is particularly desirable where the impregnated mat is to be used in fiberboard manufacture, to produce a heavier board. Following the above described processing, the mat can be subjected to pressure (e.g., about 250 p.s.i.) to compress it to a desired thickness for use as cement board. Thereafter the material can be cured (e.g., approximately two weeks at room temperature) and the resultant board trimmed to size for use as conventional cement board (i.e., it can be sawed, will receive and hold nails, etc.). It is also substantially fireproof.

In test runs on air-borne colloidal wastes, employing apparatus of the type illustrated in FIGURE 2, cement kiln gases at about 750° F. and containing approximately ½ pound of cement dust per 1000 cubic feet of gas are cooled to about 275° F., and passed through a mat of individualized redwood fibers of the type produced by the process of the Patent 3,042,977 (approximate thickness 1 inch, approximate density 0.06 pound per square foot). The average rate of advance of the mat is about 6 to 18 inches per hour. A white powdery dust slurry collects on the bottom of the plenum chamber on the inlet side of the fiber mat indicating the presence of condensed water vapor and larger agglomerates of cement particles due to cooling of the kiln gases. A high speed blower is employed (circulating about 50,000 cubic feet of gases per minute, per 100 square feet of filter area) requiring the use of a screen (¾ by 2 inch mesh) on the downstream side of the moving fiber pad. No measurable amount of cement dust is observed in the air discharged from the fiber pad, whereas the fibers of the pad are coated with the colloidal dust, indicating dust removal of the order of 95 to 98%. The temperature of the purified exhaust air is approximately 130° F.

I claim:
1. In a method for separating colloidal solids from liquid systems, the steps of dispersing a profusion of substantially individualized bark fibers in a substantially larger body of aqueous liquid wherein said fibers are distributed throughout said body as freely dispersed fibers, introducing fresh liquid containing suspended colloidal solids into said body of liquid to effect intermixing of the liquids, said colloidal solids being attracted to and caused to adhere to said freely dispersed fibers, and separating the intermixed liquids from the fibers and attached colloidal solids.

2. A method as claimed in claim 1 wherein said barkfibers are redwood fibers having a thickness no greater than about 1 millimeter and a length no greater than about 1 to 10 centimeters.

3. A method as claimed in claim 1 wherein said colloidal solids are sewage wastes.

4. A method as claimed in claim 1 wherein said colloidal solids are canning wastes.

5. In a continuous method for separating organic colloidal solids from liquids, the steps of forming an aqueous liquid body as part of a closed system, dispersing a profusion of substantially individualized bark fibers in said substantially larger liquid body, a large proportion of said fibers being present as free floating substantially individualized units on the surface of said body of liquid, continuously introducing fresh liquid containing suspended colloidal solids to said liquid body to effect intermixing of the liquids, said colloidal solids being attracted to and caused to adhere to said free floating fibers, continuously separating a portion of the intermixed liquids from the fibers and attached colloidal solids as a clarified end product, and continuously separating and removing the colloidal solids from said fibers to permit redispersal of the fibers in said liquid body.

6. A method as claimed in claim 5 wherein said fibers and attached colloidal solids are periodically removed from said liquid body, the colloidal solids separated from the fibers, and the fibers returned for redispersal in said liquid body.

7. A method as claimed in claim 5 in which the ratio of bark fiber to liquid is 1 part fiber to about 1700 parts liquid.

8. A method as claimed in claim 5 wherein redwood bark fibers are utilized.

9. A method as claimed in claim 5 wherein the bark fibers and said liquid are continuously and proportionally added to said body of liquid.

10. A method as claimed in claim 5 wherein said colloidal solids are removed from said fibers by aerobic microorganisms present in said body of liquid.

11. A method as claimed in claim 10 wherein said separated intermixed liquids are subjected to further treatment to aerate the same, and returned to said body of liquid containing aerobic microorganisms.

References Cited by the Examiner

UNITED STATES PATENTS

| 1,980,244 | 11/34 | Wright | 210—75 X |
| 2,046,845 | 7/36 | Raisch | 210—75 X |
| 2,128,432 | 8/38 | Ramage | 210—38 X |
| 2,158,954 | 5/39 | Zigerli | 210—17 X |
| 2,995,434 | 8/61 | Burton | 71—8 X |

OTHER REFERENCES

Metcalf et al.: American Sewerage Practice, vol. III, Disposal of Sewage, Third edition, 1935, McGraw-Hill, New York, pp. 477–493 relied on.

MORRIS O. WOLK, *Primary Examiner.*